Dec. 19, 1967  L. H. SMITH ET AL  3,358,954
FOLDABLE STANCHION
Filed April 20, 1966  9 Sheets-Sheet 1
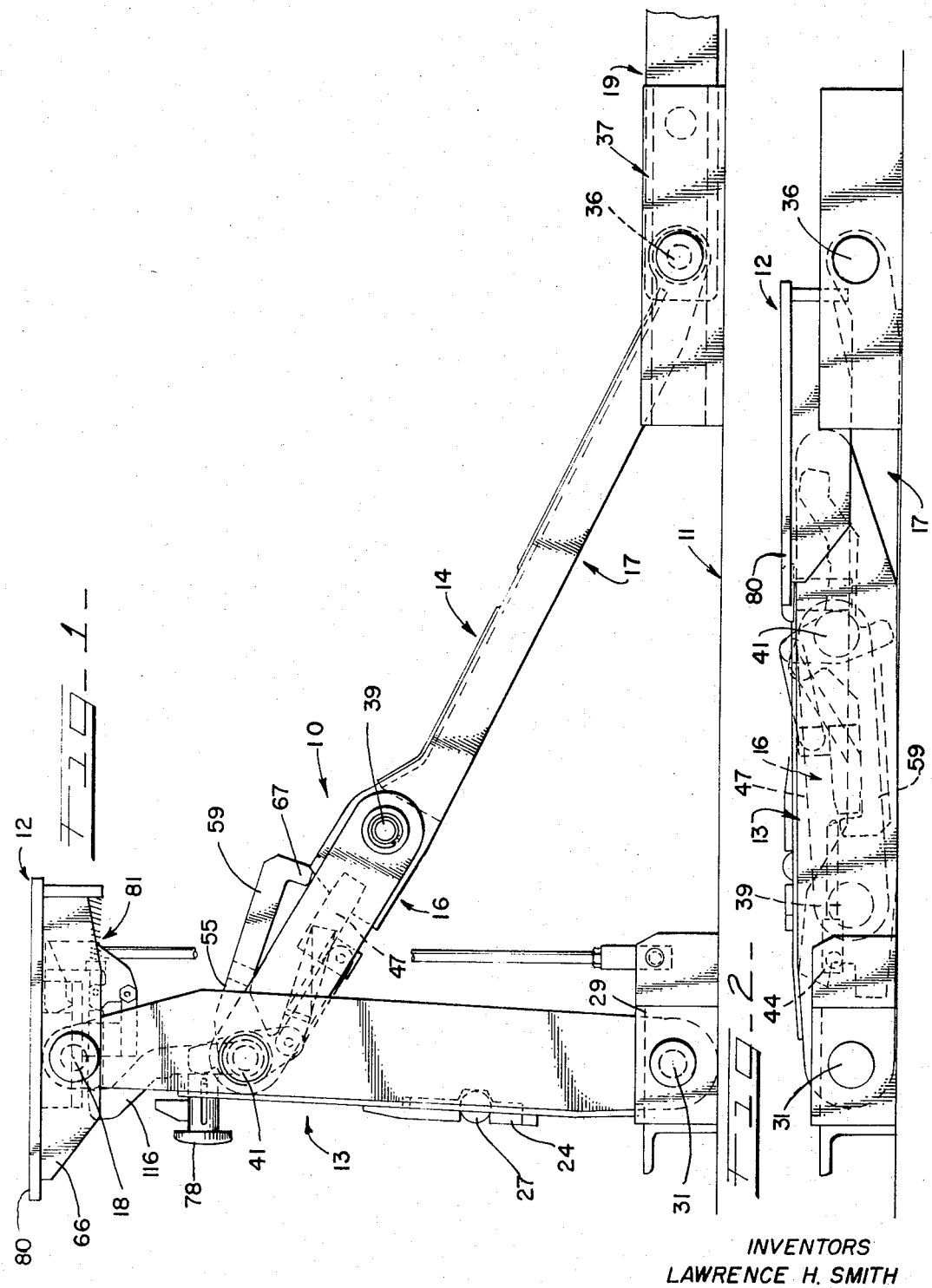
INVENTORS
LAWRENCE H. SMITH
FREDERICK A. BRAWNER
BY *Fred P. Kostka*
ATT'Y.

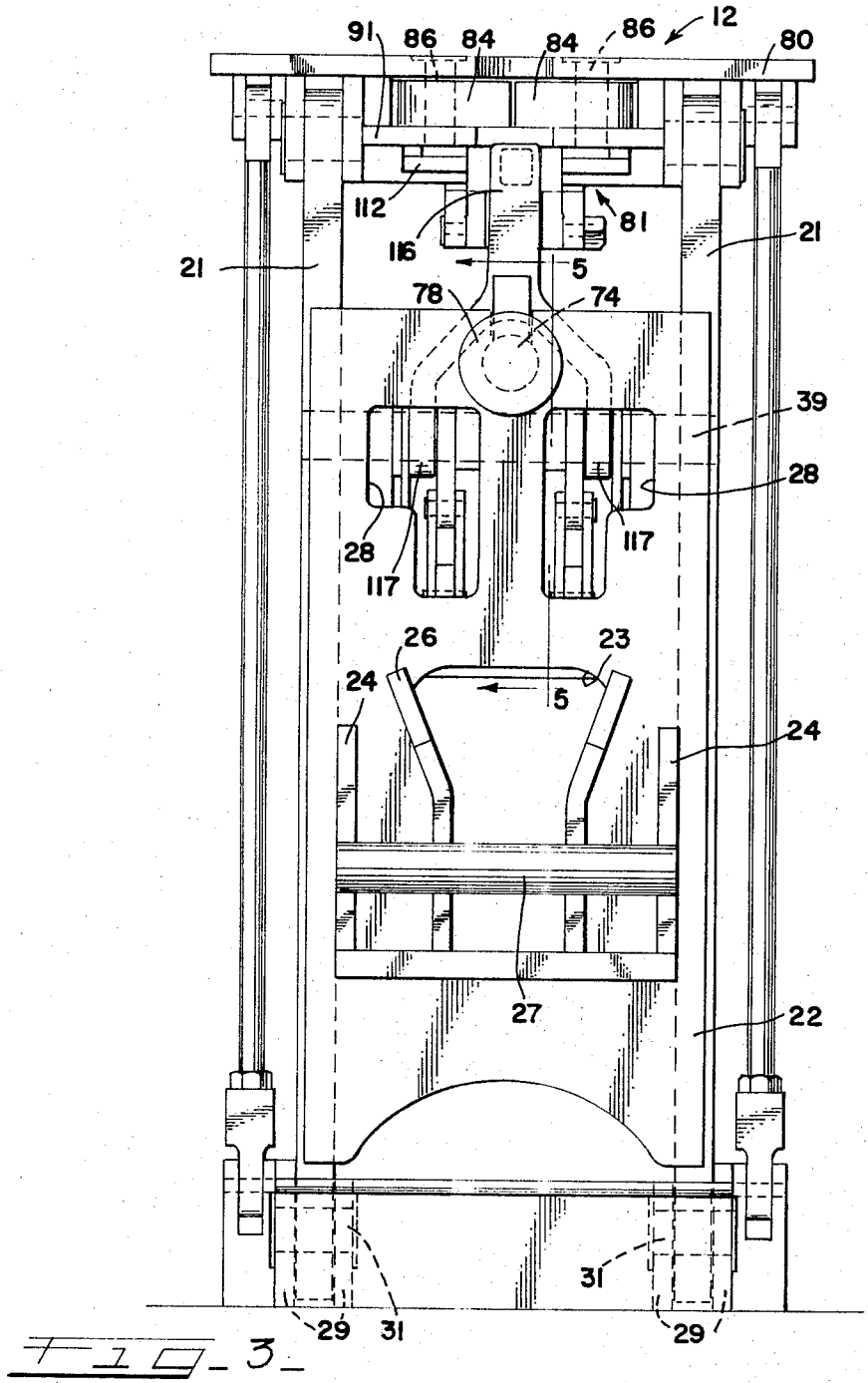

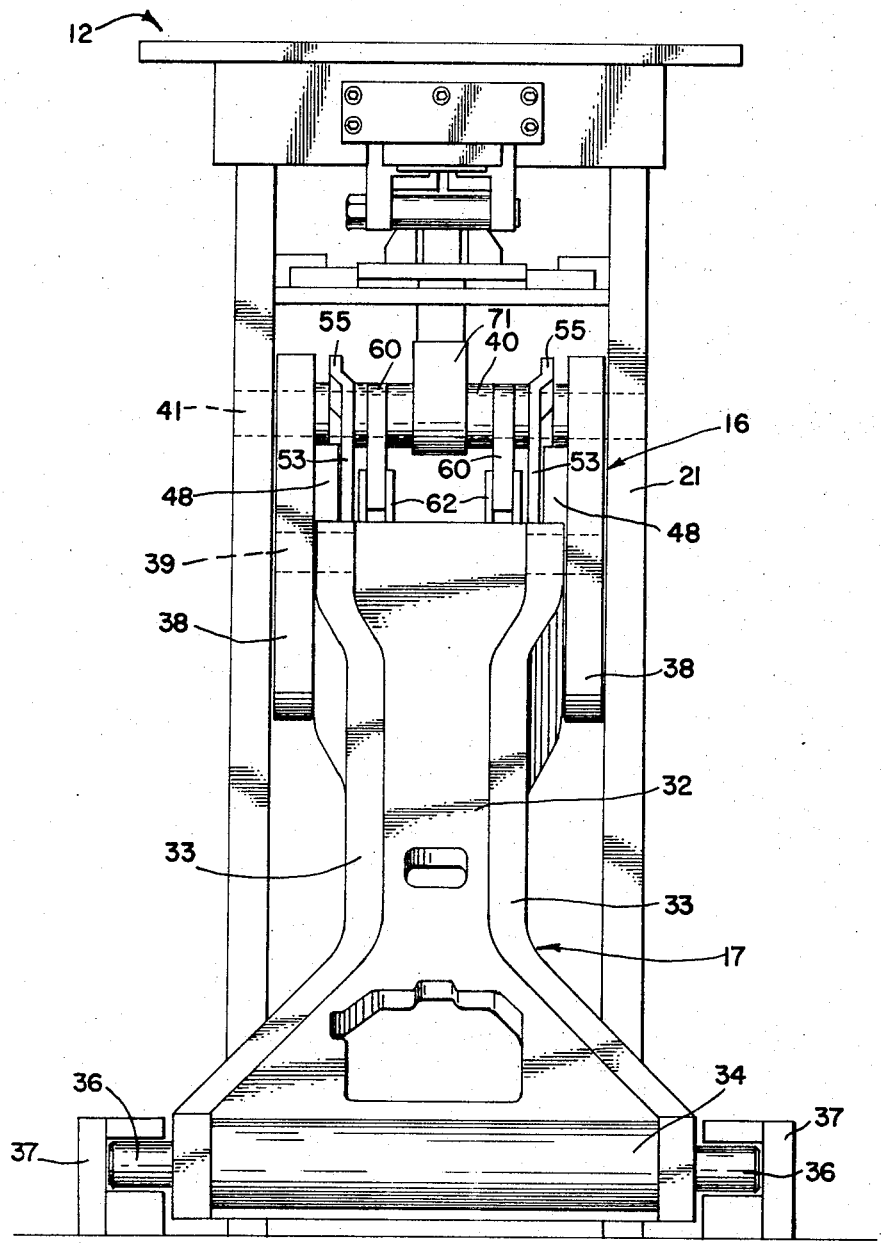

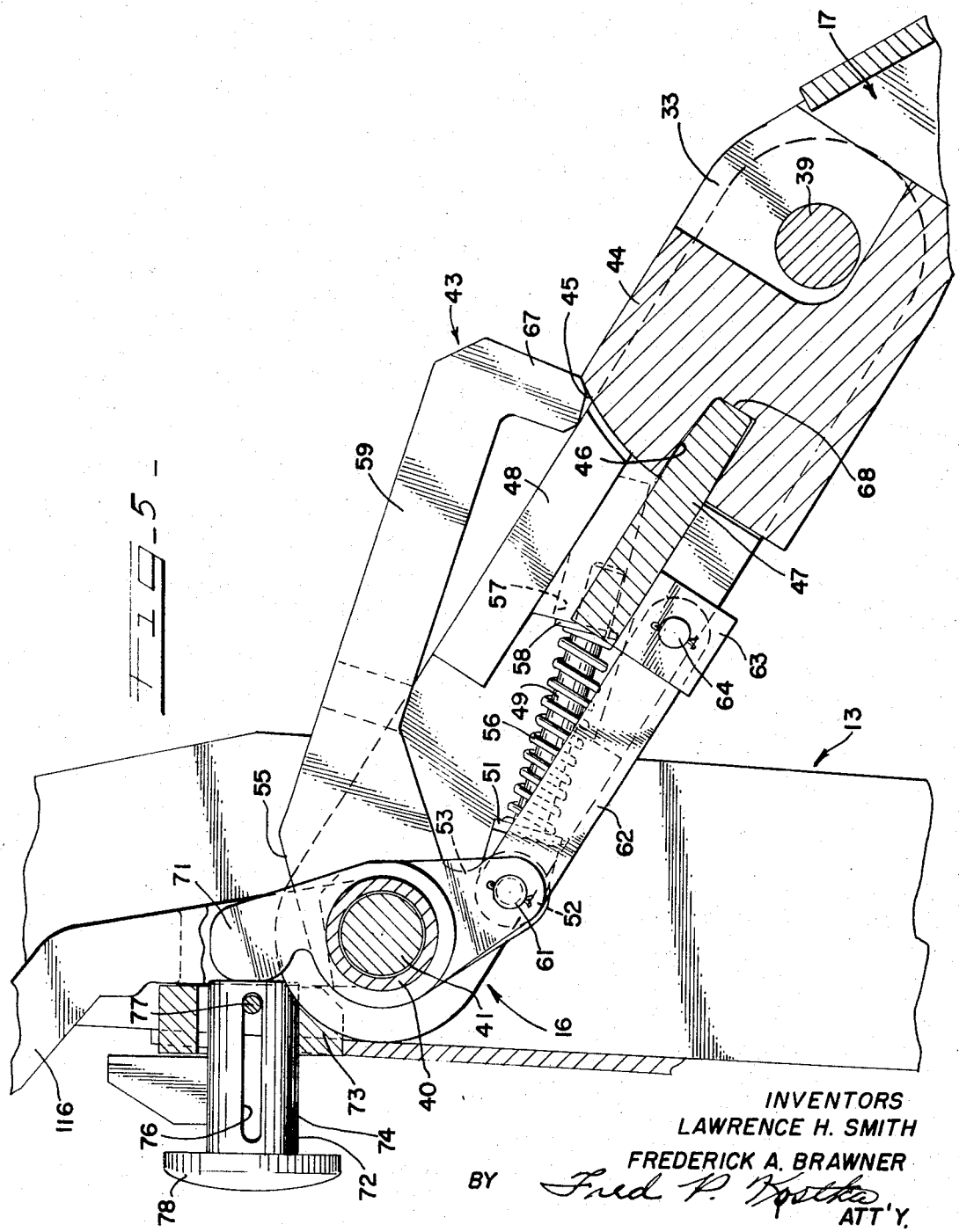

Dec. 19, 1967 L. H. SMITH ET AL 3,358,954
FOLDABLE STANCHION
Filed April 20, 1966 9 Sheets-Sheet 5
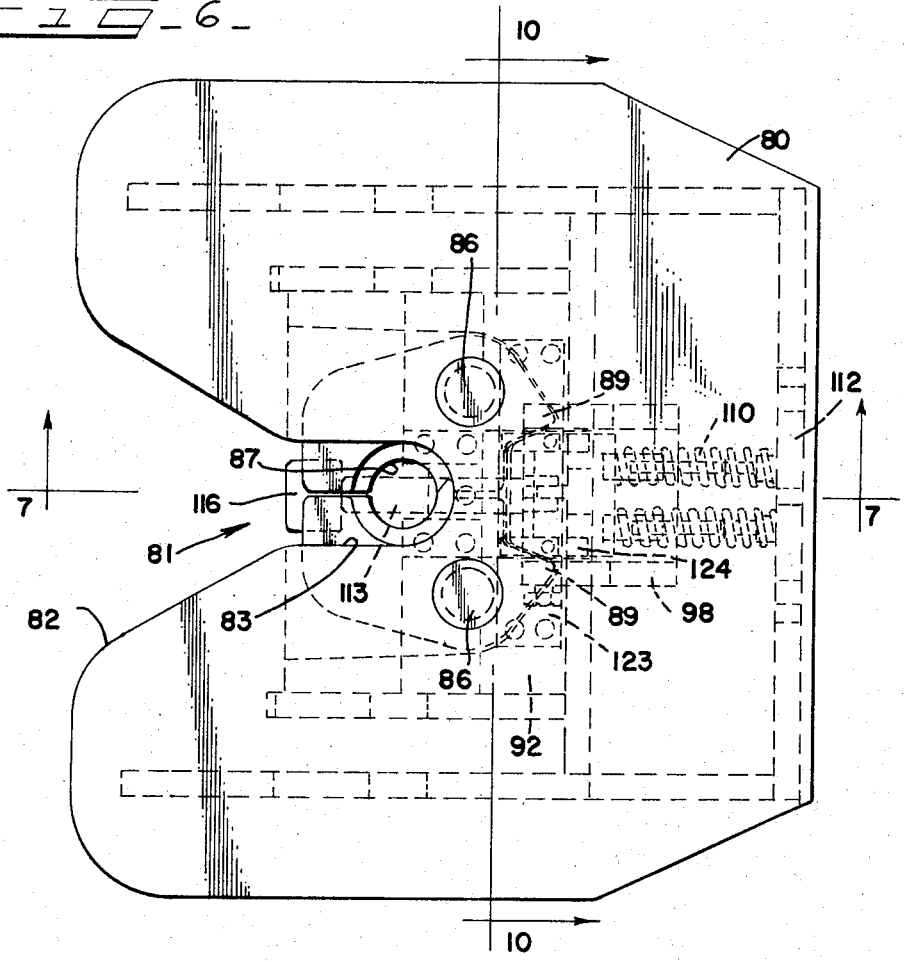
FIG-6-
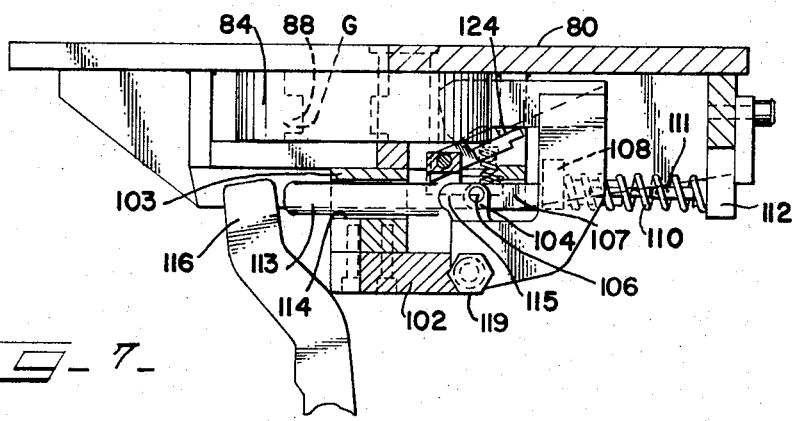
FIG-7-
INVENTORS
LAWRENCE H. SMITH
FREDERICK A. BRAWNER
BY Fred P. Kostka
ATT'Y.

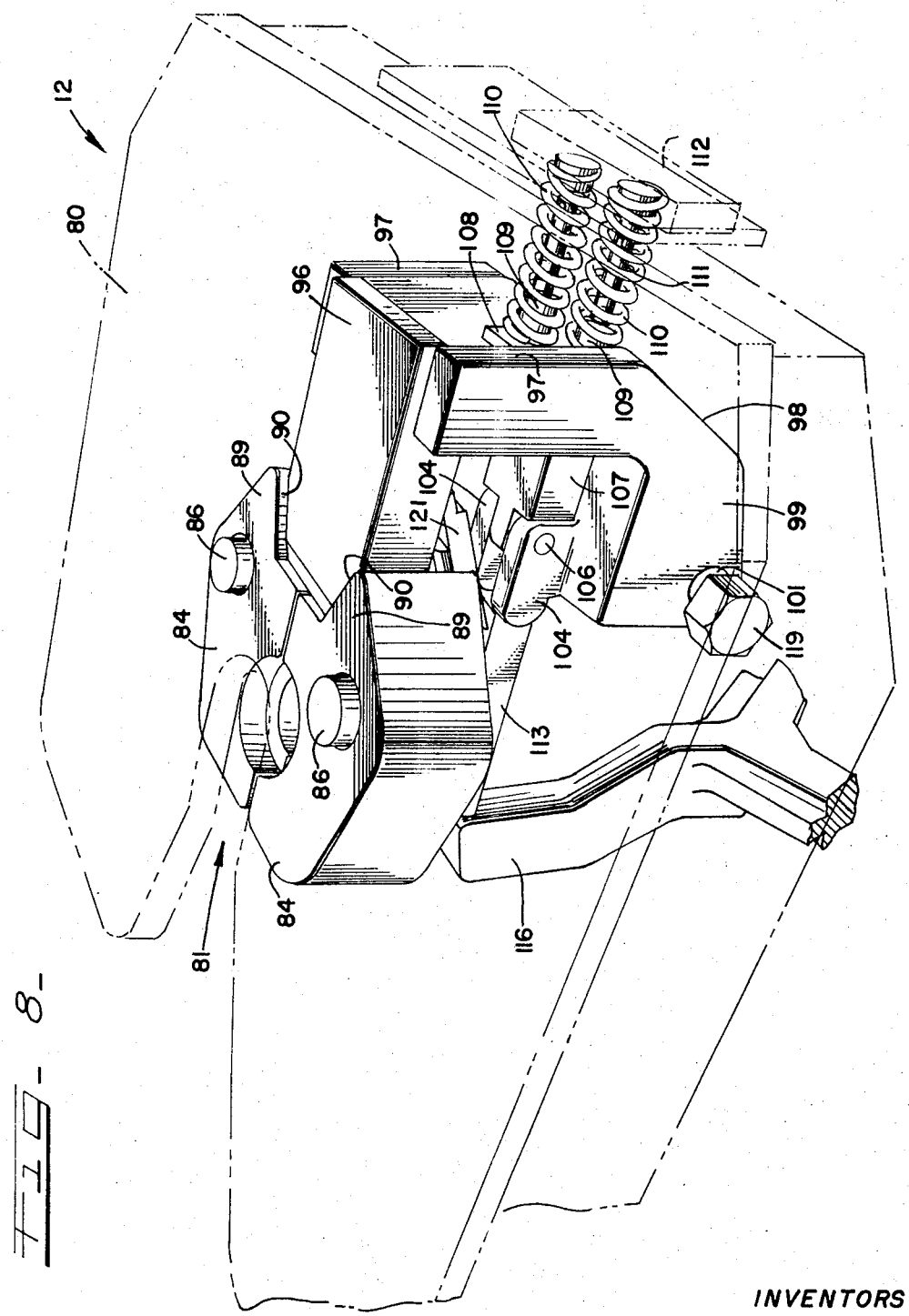

Dec. 19, 1967  L. H. SMITH ET AL  3,358,954
FOLDABLE STANCHION
Filed April 20, 1966  9 Sheets-Sheet 7

INVENTORS
LAWRENCE H. SMITH
FREDERICK A. BRAWNER
BY
ATT'Y.

Dec. 19, 1967  L. H. SMITH ET AL  3,358,954
FOLDABLE STANCHION
Filed April 20, 1966  9 Sheets-Sheet 8
FIG. 11
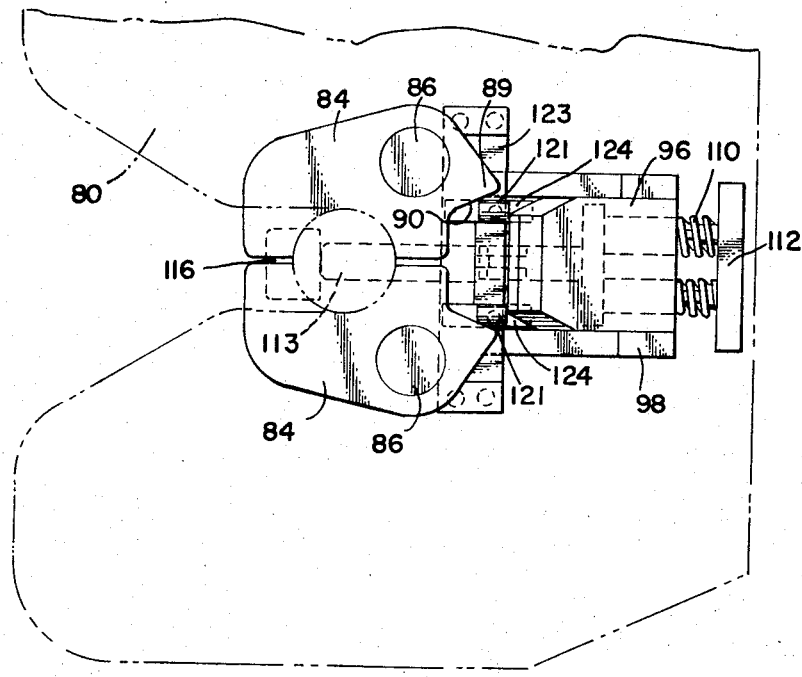
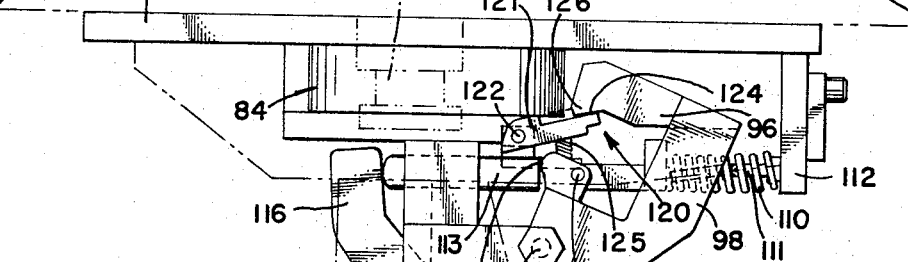
FIG. 12
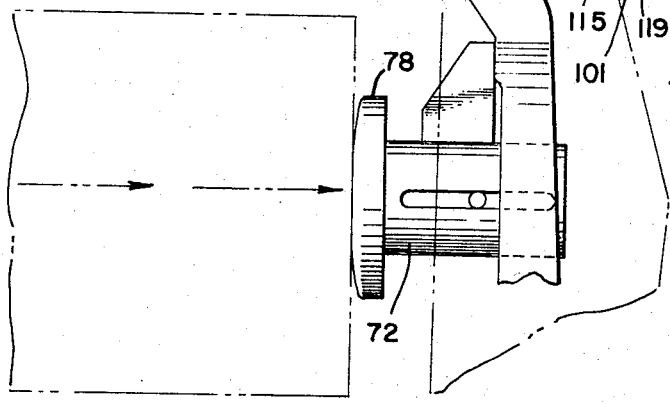
INVENTORS
LAWRENCE H. SMITH
FREDERICK A. BRAWNER
BY Fred P. Koster
ATT'Y.

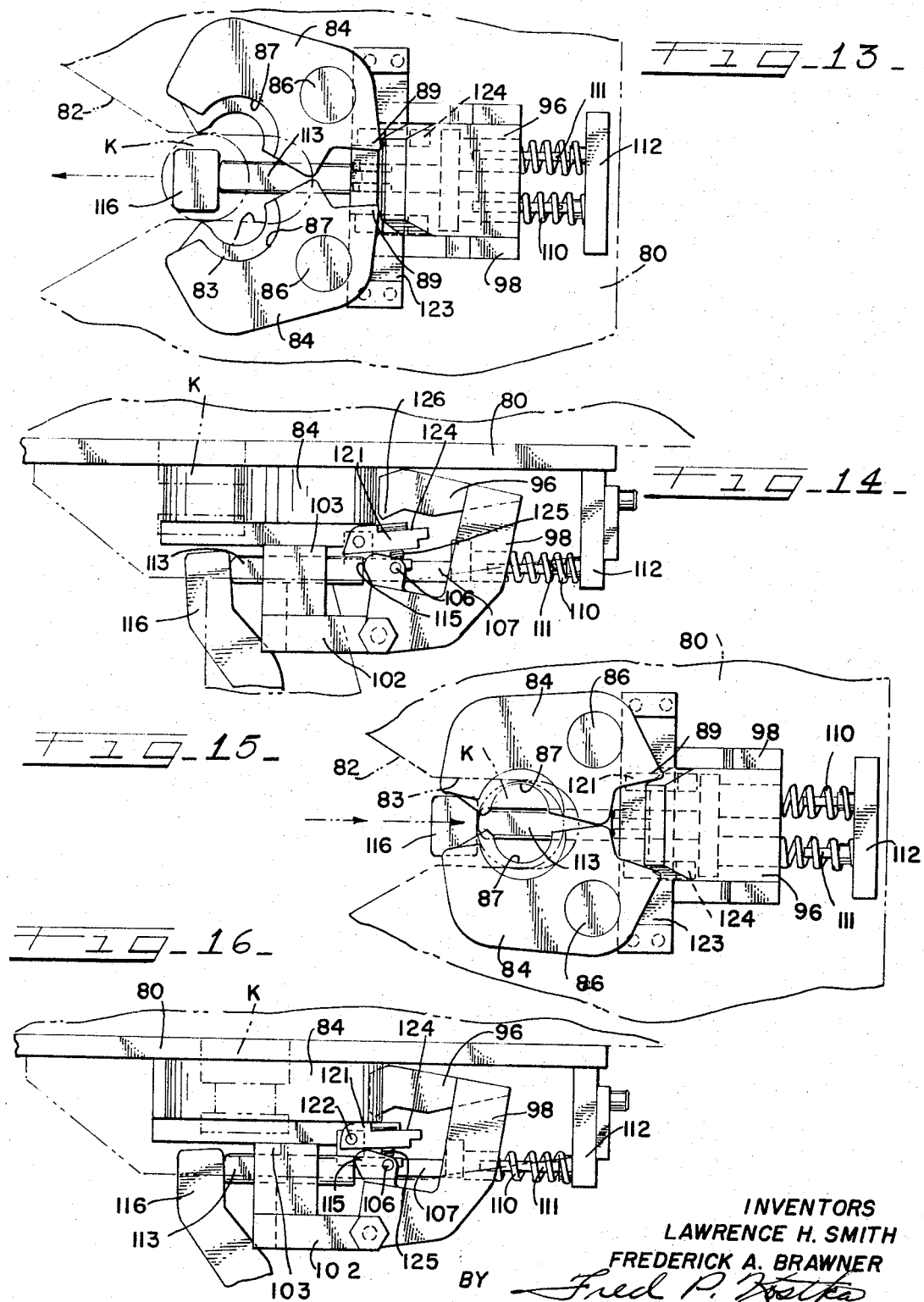

United States Patent Office 3,358,954
Patented Dec. 19, 1967

3,358,954
FOLDABLE STANCHION
Lawrence H. Smith, Bloomfield Hills, and Frederick A. Brawner, Detroit, Mich., assignors to Pullman Incorporated, Chicago, Ill., a corporation of Delaware
Filed Apr. 20, 1966, Ser. No. 543,909
9 Claims. (Cl. 248—119)

ABSTRACT OF THE DISCLOSURE

A foldable stanchion for supporting a trailer fifth wheel on a railway car floor includes a vertical strut held in upright position by a pair of pivotally connected diagonal struts which are maintained in erected longitudinally aligned relation by cooperating latch plate and keeper slot means respectively provided in their abutting ends, and kingpin latching jaws mounted on the vertical strut are unlatched by movement of the tractor and alternatively can be unlatched manually for crane-lifting of the trailer from the car.

The present invention relates to stanchions of the type used in hitching a semi-trailer on a railway flat car and more particularly to a stanchion including a fifth wheel plate supported by an upright and a foldable diagonal strut which when unfolded serves to maintain the stanchion in an erect operative semi-trailer hitching and supporting position and when folded to a collapsed position adjacent the floor permits semi-trailers and tractors, employed to move the semi-trailers, to pass thereover.

It is a principal object of the present invention to provide a collapsible stanchion of the general type described above having a fifth wheel plate carried by a right triangular support structure including an upright strut and a foldable diagonal strut with a new and novel latching means for latching the diagonal strut in a rigid unfolded position when a stanchion is raised from an inoperative collapsed position adjacent the car floor to an erect operative position, hitching and supporting a semi-trailer on a railway flat car.

It is a further object taken in conjunction with the immediately foregoing object to provide a latching arrangement including coacting means disposable on the foldable diagonal struts so as to be operative lengthwise of the foldable strut to maintain the diagonal strut rigid when the stanchion is in the erect position.

It is still a further object taken in conjunction with the immediately foregoing object to provide a new and novel releasing mechanism for releasing the latching arrangement by way of an externally applied force such as applied by a tractor or manually.

It is another object to provide a stanchion of the foregoing described type with a new and novel releasing mechanism which is operative to release both the kingpin locking jaw mechanism of the fifth wheel plate and the diagonal strut mechanism.

It is still another object to provide a new and novel kingpin locking mechanism which is suitable for both tractor and crane removal of the trailers from supporting and hitching engagement with the stanchion.

Further objects and advantages will appear from the disclosure herein of an embodiment of the invention which is presently preferred and in which support for a highway trailer fifth wheel on the floor of a railway car or the like is provided in the form of a combined vertical strut pivoted to the floor and a pair of pivotally connected diagonal strut members, the lower of which is pivoted to the floor and the upper of which is pivoted to the upper portion of the vertical strut, so that the combination can be erected with the vertical strut upright and the two diagonal strut members longitudinally aligned and forming with the floor and vertical strut a right triangle, and can be collapsed into flat folded condition on the floor by swinging the three elements about the four pivots. In the erected condition a latch plate in the lower end of the upper diagonal strut member moves in the manner of a bolt into a slot formed in the abutting or upper end of the lower diagonal strut member to stiffen the two members in longitudinal alignment. The vertical strut mounts a plate on its upper end for supporting engagement by the fifth wheel, and jaws under the plate swing laterally about vertical pivots to latch and release the kingpin alternatively on movement of the tractor into engagement with the structure or manually for crane-lifting of the trailer from the floor.

In the drawings:

FIG. 1 is a side elevational view of the stanchion embodying the principles of the present invention and showing the stanchion in its erect operative position;

FIG. 2 is a view similar to FIG. 1 but showing the chanchion in its collapsed or stored position on the floor of the railway car;

FIG. 3 is an end elevational view of the stanchion in its operative position viewed from the left end of FIG. 1;

FIG. 4 is an elevational view of the stanchion viewed from the right end of FIG. 1;

FIG. 5 is a fragmentary cross sectional view of the upright strut and the foldable diagonal strut and showing in particular the latching and releasing mechanism for retaining the stanchion and the foldable diagonal struts in the erect operative positions thereof;

FIG. 6 is a top plan view of the fifth wheel plate mounted on the upright strut of the stanchion;

FIG. 7 is a cross sectional view of the fifth wheel plate taken generally along the line 7—7 of FIG. 6;

FIG. 8 is a perspective view of the kingpin latching mechanism with the fifth wheel plate with the mounting structure omitted for clarity;

FIG. 11 is a top plan view of the locking jaw mechanism showing the components thereof in a position for crane unloading of the trailer hitched thereon;

FIG. 12 is a side elevational view of the locking jaw mechanism with the components positioned similarly to FIG. 11;

FIG. 13 is a top plan view of the locking jaw mechanism with the components shown in the kingpin release position;

FIG. 14 is a side elevational view of the locking jaw mechanism with the components positioned similarly to FIG. 13;

FIG. 15 is a top plan view of the locking jaw mechanism with the components shown in the kingpin receiving position; and FIG. 16 is a side elevational view of the locking jaw mechanism showing the components positioned similarly to FIG. 15.

Figure 9:
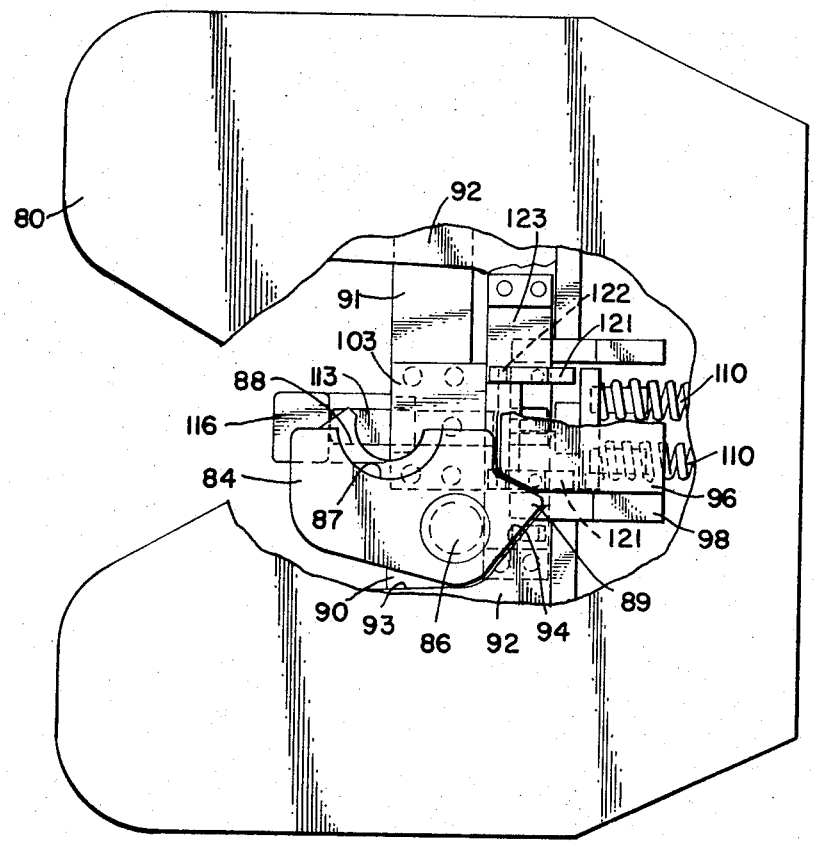
FIG. 9 is a top plan view of the fifth wheel plate assembly with some of the parts being broken away and omitted to show underlying details of structure.

Referring now to the drawings, and in particular FIGS. 1 to 5, there is shown a stanchion 10 mounted on the floor 11 of a railway car. The stanchion 10 is movable between an erect position in which it is operative to support and hitch a semi-trailer on the railway car, as shown in FIG. 1, and to a collapsed inoperative or stored position on the car floor as shown in FIG. 2.

The stanchion 10 comprises generally an upright strut 13, a diagonal strut 14 including an upper diagonal strut member 16 and a lower diagonal strut 17. Mounted on the vertical strut 13 is a fifth wheel plate 12 which supports the underside of the trailer and includes means for lockingly engaging a kingpin depending from the trailer. Associated with the diagonal strut may be a cushioning device 19 which serves to cushion the forces imposed at the kingpin depending from the underside of the trailer.

The upright strut 13, as shown in particular in FIG. 3, includes a pair of laterally spaced strut legs 21—21. Fixed to and spanning the strut legs 21—21 is a reinforcing plate 22 which may be provided with an opening 23. Spanning the opening 33 and supported by upstanding brackets 24 and 26 is a transversely extending bar or rod 27. The rod 27 provides an attachment means for a hook or a grapple which may be used to elevate the stanchion to its erect position, as more fully to be explained hereinafter. The plate 22 may also be provided with a pair of transversely spaced openings 28—28 which serve to accommodate the operation of a diagonal strut latching mechanism 43, more fully to be be explained hereinafter.

The strut members 21—21 at their lower ends are each pivotally connected between a pair of upstanding trunnion brackets 29—29 by way of a pivot pin 31. The brackets 29—29 are fixed to the floor 11 of the railway car as by welding.

The lower diagonal strut member 17 as shown in particular in FIGS. 1 and 4 may be formed as a casting having a horizontal web 32 and vertical webs 33—33 along each side of the former. At its lower end the lower diagonal strut 17 is formed with a substantially horizontal cylindrical section 34 and having fixed in the ends thereof a pair of pivot studs 36—36 which are supported within respective ones of pivot pin brackets 37 associated with the cushioning mechanism 19.

At its upper end the lower diagonal strut 17 is connected to the upper diagonal strut 16 by way of pivot pins 39 extending through transversely spaced legs 38—38 of the upper diagonal strut 16. At the upper ends the legs 38—38 are pivotally connected to the upright strut legs 21—21 by way of a pivot shaft 41. It is to be noted that the upper end of the lower diagonal strut 17 is pivotally connected to the upper diagonal strut intermediate the ends of the legs 38—38 so that the adjacent ends of the upper and lower diagonal struts 16 and 17 overlie each other. Moreover, the pivot pins 39 connecting the adjacent ends of the upper and lower diagonal strut members 16 and 17 are eccentrically disposed with respect to the pivot shaft 41 and the pivot studs 36.

For holding the upper and lower diagonal struts 16 and 17 in a linear diagonal position and thereby to lock the stanchion 10 in its erect operative position, there is provided a latching mechanism 43 as shown in particular in FIG. 1 and FIG. 5. The latching mechanism includes a keeper member 44 which is formed in the nature of a block fixed between the upright webs 33—33 of the lower diagonal strut 17. The block is slotted at its upper end with a notch 46 which receives a latch plate member 47 carried by the upper diagonal strut 16.

Biasing the latch plate member 47 into engagement with the keeper notch 46 is a biasing arrangement including a pair of transversely spaced rock levers 55 turnably journaled on a hollow cylindrical sleeve 40 which is turnably mounted on the pivot shaft 41. The rock levers 55 each include a downwardly depending arm 53 and a substantially horizontally extending arm 59 terminating at the outer end thereof in a lip 67. Connected to the downwardly depending arms 53 by means of clevises 51 are ends of rods 49 of which the other ends are slidable within openings 57 in the latch plate 47. Disposed between the clevises 51 and washers 58, slidably disposed on the rods 49 and abutting the latch plate 47, are compression springs 56. The compression springs 56 serve to urge the lip 67 into engagement with the forward upper edge 45 of the keeper and apply a biasing force on the latch plate member 47 into the keeper notch 46 when the upper and lower diagonal strut members 16 and 17 are aligned in the erect position of the stanchion 10.

The latch release mechanism includes a pair of transversely spaced lever arms 60—60 fixed to the sleeve 40 for turning movement therewith. Fixed to the lever arms 60 as by pins 61 are the ends of connecting levers 62 of which the other ends are connected by pins 64 to downwardly extending plates 63 fixed to the underside of the latch plate member 47. Upon turning of the sleeve 40 clockwise, as viewed in FIG. 5, the corresponding turning of the lever arms 60—60 causes connecting levers 62 to withdraw the latch plate member 47 out of engagement with the keeper notch 46. When the latch plate is completely free of the notch 46 the upper diagonal strut 16 is free to turn clockwise about the pivots 39 and the lower diagonal strut 17 to turn counterclockwise about the base pivots 36. As this turning of the upper and lower diagonal struts occurs the keeper block 44 rapidly drops away from engagement with and clear of the lip 67 because of the eccentric location of the pivot studs 39. Thus the compression springs 56 which are compressed by the withdrawal of the latch plate member 47 are operative to apply a turning moment force on the arms 53 causing the rock levers 55 to turn clockwise. The clockwise movement of the rock levers 55 causes the lip 67 on the arms 59 to engage the leading edge of the latch plate member 47 to hold the latter retracted until the stanchion is raised from the collapsed to erect position thereof.

For imparting rocking movement or turning to the cylindrical sleeve 40 about the pivot shaft 41, there is provided a substantially centrally located lever arm 71 which is engageable with a force application button 72 slidably disposed within a housing 73 fixed to the reinforcing plate 22 extending between the legs 21—21 of the upright strut 13. The force application button 72 is formed with a shank 74 having a longitudinally extending slot 76 which accommodates a guide shaft 77 extending across the housing opening 73. At its outer end the force application button 72 is formed with an enlarged head 78 which is adapted to be engaged by the rear end of a tractor employed to position or remove the semitrailer from the railway car upon which the stanchion 10 is adapted to be mounted.

Erection of the stanchion may be accomplished by the motivating force of the tractor used to position the semi-trailer on the railway car. Usually the trailer is backed on to the railway car until the front end thereof is over the stanchion. Thereafter, the conventional tractor fifth wheel plate is actuated to raise the front end of the semi-trailer and the kingpin is released from locking engagement with the fifth wheel plate. A hook extending from the rear end of the tractor is then applied on the bar 27 and the tractor is moved forwardly slowly so as to pull the stanchion to its upright position in which position it is locked rigid as heretofore described.

With the stanchion in the erect position shown in FIG. 1, the trailer still supported on the tractor fifth wheel plate is lowered so as to be supported on the stanchion fifth wheel plate 12 and the tractor backed sufficiently to release the hook from the bar 27. The tractor is then driven forwardly and the tractor fifth wheel plate is inclined at an angle to engage the leading edge of the trailer. The trailer is then almost entirely supported by the stanchion 10.

Thereafter, the trailer is pushed rearwardly by means of the inclined tractor fifth wheel plate. At this time the trailer kingpin K is guided into engagement with latching means on the fifth wheel plate 12 as more fully described below.

Figure 10:
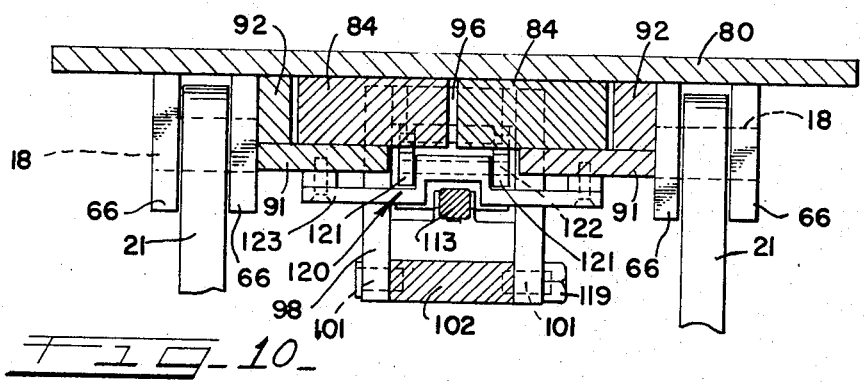
FIG. 10 is a cross sectional view taken generally along the line 10—10 of FIG. 6.

Referring now to FIGS. 6 through 15, there is shown the fifth wheel plate assembly 12 of the present invention. The fifth wheel plate assembly 12 is pivotally attached to the upper end of the upright strut 13 by means of pivot studs 18 carried by downwardly depending plates 66 fixed to the underside of a support plate 80 on which there is supported a kingpin latching mechanism 81. The support plate 80 is formed along its leading edge with a substantially V-shaped notch 82 terminating at its apex in a substantially U-shaped slot 83 which is of sufficient width to accommodate the trailer kingpin K therein.

The kingpin locking jaw mechanism 81 comprises a pair of cooperating locking jaws 84 which are mounted on vertical pivot studs 86—86 seated within the plate 80 and depending from the underside thereof. The jaws 84—84 are formed intermediate the longitudinal sides with flanged semi-circular recesses 87 so that in the kingpin latched position of the jaws 84—84 the recesses 87 form a circular opening retaining the kingpin K captured by engagement of a flange 88 within the groove G of the kingpin K, as shown for example, in FIG. 7. Adjacent and rearwardly of the pivot studs 86, the jaws 84—84 are each formed with tail-like projections 89 which in the kingpin latched position provide transversely spaced inwardly tapered sides which merge with a laterally extending end wall to form an inwardly facing open sided notch 90. Thus, in the latched position, the open-sided notches 90 form an opening in the nature of a U-shaped notch.

Supporting the underside of the respective locking jaws 84—84 are horizontal plates 91 which are fixed along the outboard ends to transversely spaced blocks 92 fixed to the underside of the plate 80. The blocks 92 are contoured along the inboard faces thereof to provide stop surfaces 93 and 94 in the open and closed positions of the jaws 84—84.

Seatable within the locking notches 90, for holding the jaws 84—84 in the kingpin latched position thereof, is a locking block 96 of a locking block assembly 98. The locking block 96 is fixed between the upper ends of a pair of transversely upstanding arms 97 extending from horizontal arms 99.

Fixed in the horizontal arms 99 are pivot studs 101 which are turnably seated within a supporting plate 102 which is fixed to the underside of a block 103 fixed to and spanning the plates 91—91. In this manner the locking block assembly 98 is turnably mounted for movement toward and away from the locking jaws 84—84.

Extending upwardly from the horizontal arms are a pair of clevis flanges 104 between which there is disposed and hingedly connected by means of a hinge pin 106 one end of a spring supporting block 107. The spring supporting block 107 includes a vertical plate 108 from which extends a pair of pins 109. Encircling and supporting one end of each of the pins 109 are compression springs 110 of which the other ends encircle pins 111 mounted on a plate 112 fixed to a flange depending from the rear edge of the fifth wheel plate 80. The springs 110 serve to normally bias the locking block assembly 98 counterclockwise, as viewed for example in FIGS. 6–8, about the pivot 106 and thereby urge the locking block 96 into engagement within the notch 90 in the jaw locked position.

In the open position of the jaws 84—84 as shown in FIG. 13 it is to be noted that the tail-like projections 89 lie in the path of movement and abut the leading edge of the locking block 96. As the kingpin K is introduced into the locking jaw assembly 81 as shown in FIGS. 14 and 15, and engages the rear portions of the semi-circular openings 87 of the jaws 84—84, the latter are caused to rotate about the pivot studs 86 whereupon the tail-like projections 89 rotate outwardly relatively to each other and out of abutting engagement with the locking block 96. The springs 110 are then operative to urge the locking block assembly 98 clockwise until the locking block 96 is seated within the notches 90. In this manner the jaws 84—84 are held against rotation and securely fasten the kingpin K of the fifth wheel plate 80.

For releasing the kingpin jaws 84—84 for rotation and thereby permitting the kingpin K to be removed, there is a lengthwise movable release bar 113 which is slidably supported in an opening 114 formed in the block 103. At its inner end the release bar 113 abuts against outwardly projecting faces 115 on the clevis flanges 104—104 and at its outer end is engageable with a release actuating lever 116.

The release actuating lever 116 as shown in FIG. 3 is formed at its lower end with bifurcated arms 117 which are fixed to the turnable sleeve 40. Upon the application of a force at the button 72 causing the sleeve 40 to turn on the shaft 41, the actuating lever 116 is also turned clockwise as viewed in FIGS. 6 and 7. The upper end of the actuating lever 117 causes the release bar 113 to move inwardly whereupon the inner end thereof in engagement with the clevis ends 115 causes the locking block assembly 98 to be rocked and the locking block 96 moved clear of the tail-like projections 89 of the locking jaws 84—84. Thereafter, as the kingpin K is withdrawn from the locking jaws 84—84, as shown in FIGS. 13 and 14, the lengthwise withdrawing movement is operative to turn the locking jaws 84—84 about the pivot studs to the open position. In this connection, it is to be noted that as the locking jaws 84—84 turn, the tail-like projections 89 move into the path of the locking block 96 and hold the latter retracted against the force of the biasing springs 110.

The foregoing operation of releasing the kingpin K is accomplished by utilizing the force applied by a tractor used to remove the trailer from the railway car. This tractor force is also utilized to collapse the stanchion 10 to the stored position, as heretofore explained. Under some circumstances the trailers are loaded and unloaded by means of cranes which lift the trailers from the car so that the stanchion need not be collapsed. To accomplish such crane unloading of the trailers there is provided a latch dog-assembly 120 which serves to retain the locking block 96 out of engagement with the locking notch 90 when the locking block assembly 98 is turned clockwise to the position shown in FIGS. 11 and 12.

The latch dog assembly as shown in particular in FIGS. 9–12 includes a pair of transversely spaced latch dogs 121 fixed on the opposite ends of a shaft 122 turnably supported in an elevated section of a transversely extending plate 123 which is attached along the ends thereof to the plates 91. The latch dogs 121 are each formed adjacent the upper leading edge thereof with a notch 124 and biasing the latch dogs 121 counterclockwise or upwardly are springs 125 supported at the lower ends thereof on the plate 123 and engaging at the other end the underside of the latch dogs.

Assuming now that a wrench is applied to a hexagonal head 119 fixed to one of the pivot studs 101 and turned, the locking block assembly 98 and the locking block 96 are accordingly turned clear of the tail-like projections 89 of the locking jaws 84—84 as shown in FIGS. 11 and 12. Under these conditions, the latching dogs 121 which are located inwardly of the locking jaw notch 90 are biased upwardly under the force of the springs 125 into engagement with a beak 126 formed on the underside of the leading edge of the locking block 96 to hold the latter latched against re-engagement with the locking notch 90. As the locking block assembly 98 is turned, the latching dogs 121 remain in engagement with the locking block beak 126, so that when the latter seats within the latching dog notches 124, return movement of the blocking block assembly 98 under the influence of the biasing springs 110 is prevented.

The kingpin K may then be withdrawn from the locking jaws 84—84 because they are now free to turn to the open position about the studs 86. Upon such turning, the tail-like projections 89 move inwardly and over the latching dogs 121 so as to depress the latter downwardly against the force of springs 125 and out of engagement with the beak 126. The locking block 96 is accordingly released and the force of the biasing springs 110 acting on the locking block assembly 98 turns the latter counterclockwise until the leading edge of the locking block 96 abuts the tail-like projections 89 as shown in FIG. 13, in which position the jaws 84—84 remain open until a kingpin K is inserted therein, as heretofore explained.

What is claimed is:

1. A stanchion for use in hitching a semi-trailer on a railway flat car and movable from a collapsed stored position on the car to an erect operative position forming a substantially triangular support, said stanchion comprising an upright strut connected at one end to an upright strut pivot means fixed to said car, a diagonal strut including an upper diagonal strut member and a lower diagonal strut member, pivot means connecting the adjacent ends of said upper and lower diagonal strut members so that said lower diagonal strut member and upper diagonal strut member are folded about said pivot means connecting said adjacent ends in the collapsed position of said stanchion and are turnable to an unfolded linearly aligned position in the erect position of said stanchion, said lower diagonal strut member being connected to a diagonal strut pivot means mounted on said car and spaced lengthwise from said upright strut pivot means, said upper diagonal strut member being pivotally connected relatively to said upright strut, coacting latch means mounted on said adjacent ends of said upper and lower diagonal strut members including keeper means fixed to one of said diagonal strut members and having a slot open to said end of said member, and slidable latch plate means mounted on said adjacent end of the other of said diagonal strut members for sliding movement longitudinally of said member into said slot for latching engagement with said keeper means when said upper and lower diagonal strut members are in said linearly aligned position whereby said upper and lower diagonal strut members are stiffened in said alignment and said stanchion is maintained in said erect position, and a fifth wheel plate mounted on said upright strut.

2. The invention as defined in claim 1 wherein said latch means includes spring means biasing said slidable latch means into engagement with said keeper means.

3. The invention as defined in claim 2 wherein said stanchion includes latch release means mounted on said upright strut for movement from an inoperative position to a latch release position, said latch release means including force receiving means projecting outwardly of said upright strut, and means operative to withdraw said latch means out of latching engagement with said keeper means when a force is applied to said force receiving means to move said latch means to said latch release position.

4. The invention as defined in claim 3 wherein said latch release means includes means turnably supported on said pivot means connecting said upper diagonal strut member to said upright strut, a lever arm fixed to said turnably supported means, and linkage means connecting said lever arm and said latch plate means so that upon the turning of said turnably supported means said latch plate means is withdrawn from said keeper means.

5. The invention as defined in claim 4 wherein a rock arm is turnably mounted on said turnably mounted means and including a first arm connected to said spring biasing means and a second arm having a lip which is engageable with said latch plate means for retaining said latch plate means out of engagement with said keeper means after said latch means is withdrawn from said keeper means by said first lever arm and linkage means.

6. The invention as defined in claim 5 wherein a force receiving arm is fixed to and extending upwardly from said turnably mounting means, and wherein a force receiving button is mounted on said upright strut for lengthwise movement and is engageable at one end with said force receiving arm, said force receiving button having its other end extending outwardly of said upright strut so as to be actuated by an externally applied force causing said button to be moved longitudinally and turn said turnably mounted means.

7. The invention as defined in claim 6 wherein said fifth wheel plate comprises a locking jaw assembly including a pair of complementary kingpin jaw members, means mounting said jaw members for turning movement between a kingpin receiving position and a kingpin locked position, said jaw members each having a notched end which forms a U-shaped notch in the kingpin locked position of said jaws, a locking block, means mounting said locking block for turning movement into and out of engagement with said U-shaped notch, spring means biasing said locking block mounting means toward said locking jaw, and longitudinally movable means engageable with said locking block mounting for opposing said biasing means and operative upon the application of a force thereto to turn said locking block mounting means to a position which disenages said locking block means out of engagement with said U-shaped notch.

8. The invention as defined in claim 7 wherein said locking block mounting means includes means for manually turning the same, and wherein spring biased latch dog means lie in the path of movement of said locking block during disengagement with said U-shaped notch and are operative to hold said locking block retracted from said U-shaped notch, said latch dog means lying in the path of movement of said jaw members from said locked to kingpin receiving position whereby said jaw members are operative to depress said latch dog means out of engagement with said locking block.

9. A fifth wheel plate assembly for a stanchion comprising a fifth wheel plate, a locking jaw assembly mounted on said plate including a pair of complementary kingpin jaw members, means mounting said jaw members for turning movement between a kingpin receiving position and a kingpin locked position, said jaw members each having a notched end which combine to form a U-shaped notch in the kingpin locked position of said jaw members, a locking block, means mounting said locking block for turning movement into and out of engagement with said U-shaped notch, spring means biasing said locking block mounting means toward said jaw members, and longitudinally movable means engageable with said locking block mounting means for opposing said biasing means and operative upon the application of a force thereto to turn said locking block mounting means to a position which disengages said locking block means out of engagement with said U-shaped notch, said locking block mounting means including means for manually turning the same, in combination with spring biased latch dog means lying in the path of movement of said locking block during disengagement with said U-shaped notch and operative to hold said locking block retracted from said U-shaped notch, and said latch dog means lying in the path of movement of said jaw members from said locked to kingpin receiving position whereby said jaw members are operative to depress said latch dog means out of engagement with said locking block.

References Cited

UNITED STATES PATENTS

| 3,041,028 | 6/1962 | McDowell | 248—119 |
| 3,050,320 | 8/1962 | Clejan | 287—20 |
| 3,225,707 | 12/1965 | Rollins et al. | 248—119 X |
| 3,252,432 | 5/1966 | Hartzell | 248—119 X |

ROY D. FRAZIER, *Primary Examiner.*

R. P. SEITTER, *Assistant Examiner.*